United States Patent [19]

Sato et al.

[11] 4,450,094
[45] May 22, 1984

[54] NEMATIC LIQUID CRYSTAL COMPOSITIONS FOR DISPLAY APPARATUSES

[75] Inventors: Hideo Sato; Yasuyuki Goto; Hideo Saito; Shinichi Sawada, all of Yokohamashi; Keiichi Matsunami, Kawasakishi; Kohzo Hirata, Yokohamashi, all of Japan

[73] Assignee: Chisso Corporation, Osaka, Japan

[21] Appl. No.: 219,921

[22] Filed: Dec. 24, 1980

[30] Foreign Application Priority Data

Dec. 28, 1979 [JP] Japan .................... 54-172753
Jan. 18, 1980 [JP] Japan .................... 55-4235

[51] Int. Cl.³ .................... C09K 3/34; C02F 1/13
[52] U.S. Cl. .................... 252/299.61; 350/332; 350/333; 350/350 R
[58] Field of Search .................... 252/299.61; 350/332, 350/333, 350 R

[56] References Cited

U.S. PATENT DOCUMENTS

| | | | |
|---|---|---|---|
| 4,200,580 | 4/1980 | Hsu | 252/299.61 |
| 4,322,354 | 3/1982 | Sorkin | 252/299.61 |
| 4,344,856 | 8/1982 | Demus et al. | 252/299.61 |
| 4,348,324 | 9/1982 | Demus et al. | 252/299.5 |
| 4,364,838 | 12/1982 | Boller et al. | 252/299.61 |
| 4,372,871 | 2/1983 | Toriyama et al. | 252/299.66 |

FOREIGN PATENT DOCUMENTS

| | | | |
|---|---|---|---|
| 139867 | 1/1980 | German Democratic Rep. | 252/299.61 |
| 139852 | 1/1980 | German Democratic Rep. | 252/299.61 |
| 2044767 | 10/1980 | United Kingdom | 252/299.61 |

OTHER PUBLICATIONS

Sorkin, Howard; Mol. Cryst. Liq. Cryst., vol. 56 (Letters), pp. 279-281, (1980).

*Primary Examiner*—Teddy S. Gron
*Attorney, Agent, or Firm*—Fred Philpitt

[57] ABSTRACT

Liquid crystal compositions suitable for liquid crystal display elements according to multiplexing mode are provided. The compositions consist of at least one nematic liquid crystal compound having a positive dielectric anisotropy ($N_p$) and at least one nematic liquid crystal compound having a negative dielectric anisotropy ($N_n$), at least one compound of the group consisting of said at least one $N_p$ and said at least one $N_n$ being expressed by the general formula

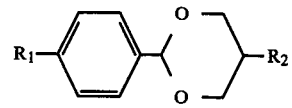

wherein $R_1$ is 1-10 C alkyl group or alkoxy group, carboxyl group or cyano group and $R_2$ is 1-10 C alkyl group or alkoxy group or carboxyl group.

2 Claims, No Drawings

NEMATIC LIQUID CRYSTAL COMPOSITIONS FOR DISPLAY APPARATUSES

BACKGROUND OF THE INVENTION

This invention relates to liquid crystal compositions for display elements, and more particularly it relates to liquid crystal compositions suitable for liquid crystal display elements according to multiplexing mode.

Recently, liquid crystal display apparatuses have been employed in various fields, and above all, in apparatuses needing a large number of informations, e.g. electronic calculators, matrix displays, etc., multiplexing mode according to voltage-leveling method, or the like has often been employed beside static drive mode. In the case of electronic calculators or the like, particularly a low voltage drive of 3 V drive which can be used in series connection of two cells, has been employed. This low voltage drive mode is characterized in that it is possible to keep the cell life over 500 to 2,000 hours by combining the above mode with C-MOSIC, without needing any voltage-elevating circuit. However, when the multiplexing mode is employed, a factor margin (M) which has never been raised as a problem in the case of the above static drive mode, has occurred as an important electroptical characteristic. The margin M is defined by the following equation:

$$M(\%) = \frac{V_{90} - V_{10}}{\frac{V_{10} + V_{90}}{2}} \times 100$$

wherein $V_{10}$ represents a voltage at which the percentage transmission at the selected point at 0° C. is 10% and $V_{90}$ represents a voltage at which the percentage transmission at the non-selected point at 40° C. is 90%. It is known that materials having a higher value of such margin M are suitable to the above multiplex.

Further, it has been experimentally known that as combinations of liquid crystal compounds which make the margin M higher, those of nematic liquid crystal compounds having a positive dielectric anisotropy ($N_p$) with nematic liquid crystal compounds having a negative dielectric anisotropy ($N_n$) show preferable results. Furthermore it has also been experimentally confirmed that the larger the proportion of the $N_n$ component in the compositions, the higher the margin M. On the other hand, the larger the proportion of the $N_n$ component, naturally the smaller the positive dielectric anisotropy $\Delta\epsilon$ of the compositions. As a result the aimed low voltage drive is impossible.

One of other factors influencing the margin M is the temperature dependence of specific voltage values. In order to increase the margin M, it is necessary to make the temperature dependence of specific voltage values as small as possible. Further, in order that the low voltage drive is possible even in higher proportions of $N_n$ component in the compositions, it is necessary that the $\Delta\epsilon$ of the $N_p$ component in the compositions be large; and in order to reduce the temperature dependence of specific voltage values, it is necessary to reduce the viscosity of the liquid crystal compositions. Thus the present inventors have made strenuous studies on liquid crystal compositions for multiplexing which can satisfy the above-mentioned various conditions. The object of the present invention is to provide such liquid crystal compositions for multiplexing.

SUMMARY OF THE INVENTION

The present invention resides in:
a nematic liquid crystal composition consisting of at least one nematic liquid crystal compound having a positive dielectric anisotropy ($N_p$) and at least one nematic liquid crystal compound having a negative dielectric anisotropy ($N_n$),
at least one compound of the group consisting of said at least one $N_p$ and said at least one $N_n$ being expressed by the general formula:

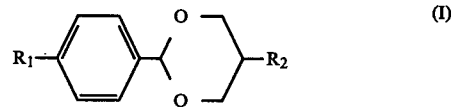

wherein $R_1$ represents an alkyl group or an alkoxy group, each having 1 to 10 carbon atoms, carboxyl group or cyano group, and $R_2$ represents an alkyl group or an alkoxy group, each having 1 to 10 carbon atoms, or carboxyl group.

$N_p$ and $N_n$ other than those of the general formula (I) may be not always liquid crystal compounds, but may be so-called liquid crystal-like compounds, i.e. similar compounds to liquid crystal compounds in the structural formulae.

The above nematic liquid crystal compositions of these systems exhibit superior characteristics suitable to dynamic drive in that they have not only lower C-N points, but lower viscosities and also their changes in the characteristics depending on the temperature dependence are very small.

PREFERRED EMBODIMENTS OF THE INVENTION

Particularly preferred combinations of $R_1$ with $R_2$ in the general formula (I), and the liquid crystal temperature ranges of the resulting compositions are shown in Table 1.

TABLE 1

| In formula (I) | | Transition point (°C.)* | | | |
|---|---|---|---|---|---|
| $R_1$ | $R_2$ | C-I point | C → N point | I → N point | Remarks |
| CN | $C_4H_9$ | 42 | — | 35.5 | Monotropic |
| CN | $C_5H_{11}$ | 55 | — | 48 | " |
| CN | $C_6H_{13}$ | 47 | — | 40.5 | " |
| CN | $C_7H_{15}$ | 54 | — | 52 | " |
| CN | $C_8H_{17}$ | 48.5 | — | 44.5 (Smectic) | " |
| $C_3H_7O$ | $C_4H_9$ | 43 | — | 25 | " |
| $C_4H_9O$ | $C_4H_9$ | 44 | — | 40 | " |
| $C_5H_{11}O$ | $C_4H_9$ | 49 | — | 35 | " |
| $C_6H_{13}O$ | $C_4H_9$ | — | 31 | 43 | |
| $C_3H_7O$ | $C_5H_{11}$ | — | 37.5 | 40.5 | |
| $C_4H_9O$ | $C_5H_{11}$ | — | 40 | 53 | |
| $C_5H_{11}O$ | $C_5H_{11}$ | — | 38 | 50.5 | |
| $C_6H_{13}O$ | $C_5H_{11}$ | — | 44 | 56 | |

*(C: solid phase, N: nematic phase, I: transparent phase)

The compounds of the formula (I) are obtained by condensation a p- substituted benzaldehyde with a 2-alkyl-1,3-propylene glycol in the presence of a dilute acid. For example, in the case of compounds wherein $R_1$ is cyano group and $R_2$ is an alkyl group, they are obtained by condensing p-cyanobenzaldehyde with a 2-alkyl-1,3-propylene glycol in the presence of a dilute acid.

Preferred concrete examples of the nematic liquid crystal compositions of the present invention will be given in the following Examples.

EXAMPLE 1

A liquid crystal composition consisting of the following 7 components was prepared:

as $N_n$s,

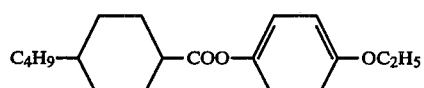
10% by weight*

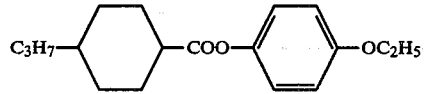
10%

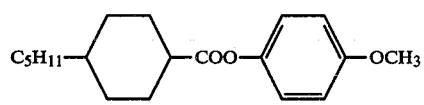
10%

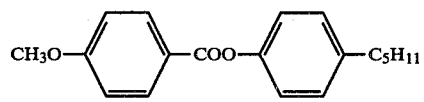
15%, as $N_p$s in the form of compounds of formula (I),

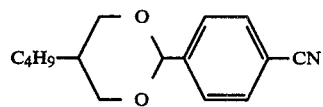
25%

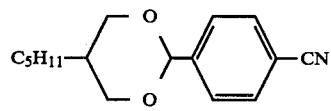
20%, and as another $N_p$,

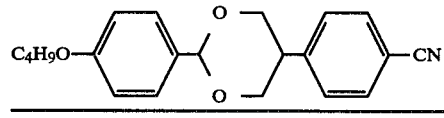
10%.

*(This "by weight" applies to the succeeding percentages.)

The liquid crystal temperature range of the resulting composition was measured to give −20° C. or lower to +62° C. (it was impossible to measure temperatures lower than −20° C. according to a measurement apparatus employed by us), and its viscosity at 20° C. was 30 cp. Further, at the time of a dynamic drive at ⅓ duty and ⅓ bias, the operating voltage was 2.9 V, the margin M was 30% and the temperature dependence (temperature coefficient ΔVth/ΔT) of the threshold voltages at 0° C. to 40° C. showed as small a value as 5 mV/°C. Thus, the composition was suitable as a liquid crystal composition for multiplexing.

EXAMPLE 2

A liquid crystal composition consisting of the following 6 components showed liquid crystal temperatures in the range of −20° C. or lower to +63° C. and a viscosity of 32 cp at 20° C.:

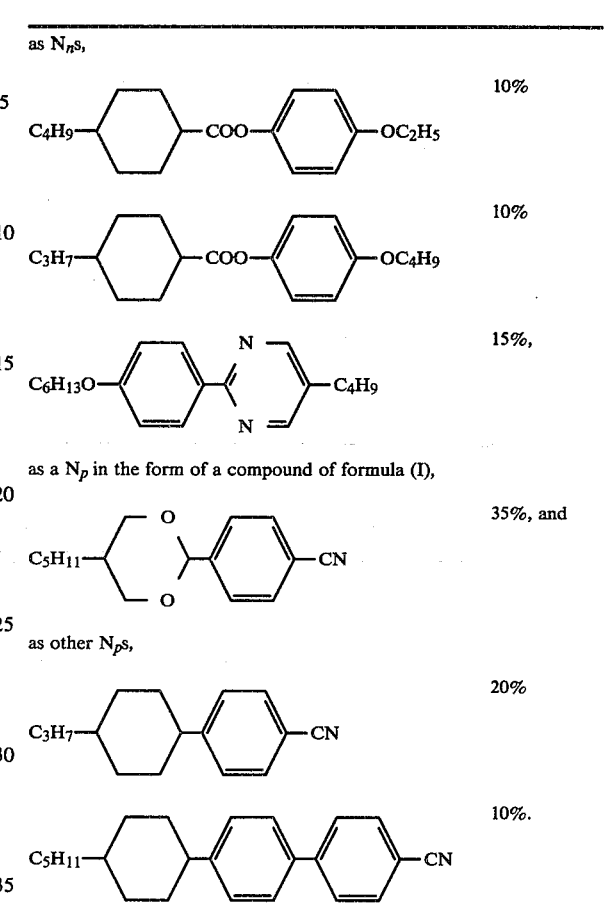

Further, at the time of a dynamic drive at ⅓ duty and ⅓ bias, the operating voltage was 3.1 V, the margin M was 20% and the temperature dependence of the threshold voltages at 0° C. to 40° C. was 7 mV/°C.

EXAMPLE 3

A liquid crystal composition consisting of the following 6 components showed liquid crystal temperatures in the range of −20° C. or lower to +64° C. and a viscosity of 30 cp at 20° C.:

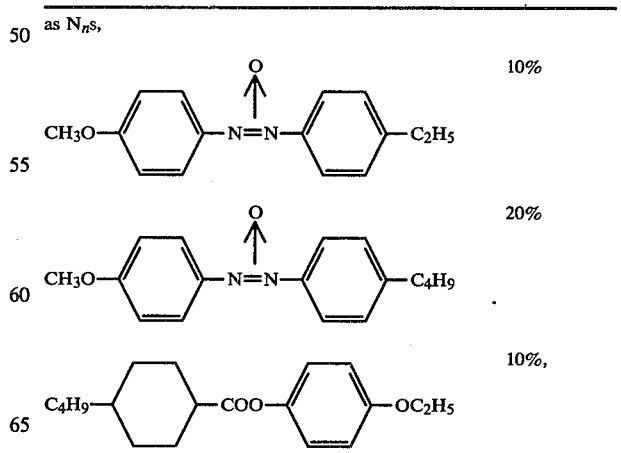

as $N_p$s in the form of compounds of formula (I),

-continued

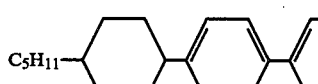
25%

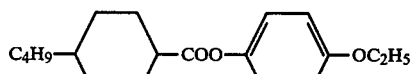
25%, and as another $N_p$,

10%.

Further, at the time of a dynamic drive at ⅓ duty and ⅓ bias, the operating voltage was 3.2 V, the margin M was 32% and the temperature dependence of the threshold voltages at 0° C. to 40° C. was 4 mV/°C.

EXAMPLE 4

A liquid crystal composition consisting of the following 6 components showed liquid crystal temperatures in the range of −20° C. or lower to +60° C. and a viscosity of 37 cp at 20° C.:

as $N_n$s,

10%

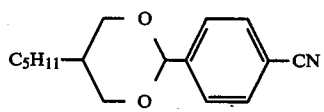
10%

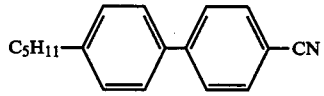
10%, as a $N_p$ in the form of a compound of formula (I),

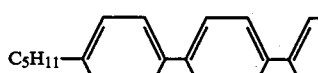
40%, and as other $N_p$s,

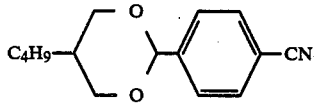
20%

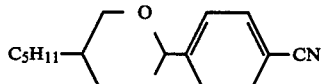
10%.

Further, at the time of a dynamic drive at ⅓ duty and ⅓ bias, the operating voltage was 2.7 V, the margin M was 16% and the temperature dependence of the threshold voltages at 0° C. to 40° C. was 8 mV/°C.

EXAMPLE 5

A liquid crystal composition consisting of the following 6 components showed liquid crystal temperatures in the range of −20° C. or lower to +65° C. and a viscosity of 25 cp at 20° C.:

as $N_n$s in the form of compounds of formula (I),

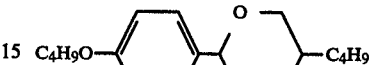
10%

10%

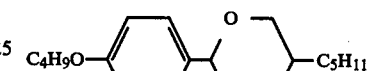
10%, and as $N_p$s,

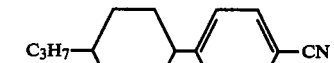
30%

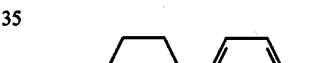
25%

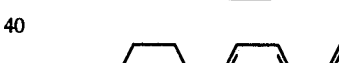
15%.

The liquid crystal temperature range of the resulting composition was measured to give −20° C. or lower to +65° C., and its viscosity at 20° C. was 25 cp. Further, at the time of a dynamic drive at ⅓ duty and ⅓ bias, the operating voltage was 3.7 V, the margin M was 28% and the temperature coefficient of the threshold voltages at 0° to 40° C. was 4 mV/°C.

EXAMPLE 6

A liquid crystal composition consisting of the following 6 components showed liquid crystal temperatures in the range of −15° C. to +60° C. and a viscosity of 30 cp at 20° C.:

as $N_n$s in the form of compounds of formula (I),

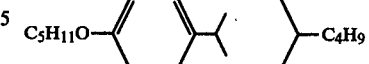
10%

-continued

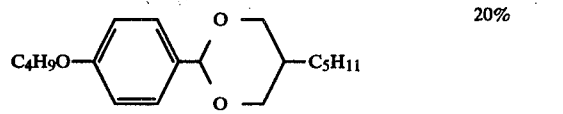 20%

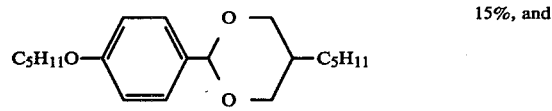 15%, and as $N_p$s in the form of compounds of formula (I),

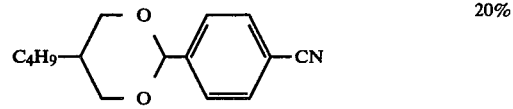 20%

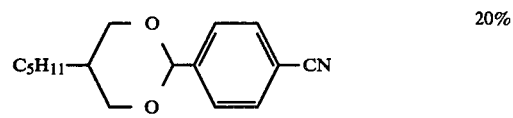 20% as another $N_p$,

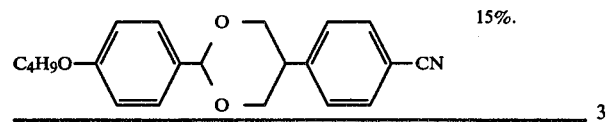 15%.

Further, at the time of a dynamic drive at ⅓ duty and ½ bias, the operating voltage was 2.9 V, the margin M was 30% and the temperature coefficient of the threshold voltages at 0° to 40° C. was 5 mV/°C.

EXAMPLE 7

A liquid crystal composition consisting of the following 6 components showed liquid crystal temperatures in the range of −20° C. or lower to 62° C. and a viscosity of 48 cp at 20° C.:

as a $N_n$ in the form of a compound of formula (I),

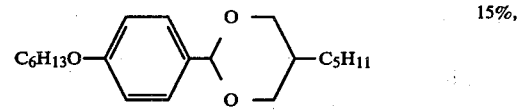 15%, as other $N_n$s,

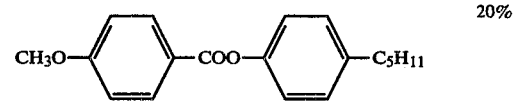 20%

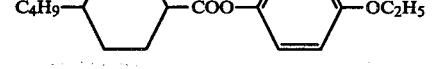 10%, and as $N_p$s,

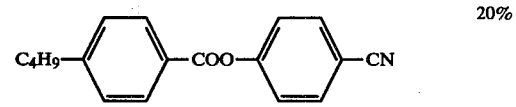 20%

-continued

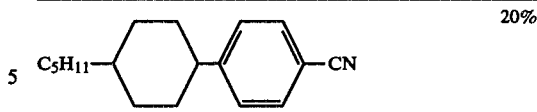 20%

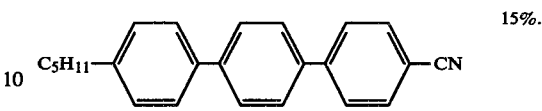 15%.

Further, at the time of a dynamic drive at ⅓ duty and ½ bias, the operating voltage was 3.0 V, the margin M was 20% and the temperature coefficient of the threshold voltages at 0° C. to 40° C. was 8 mV/°C.

EXAMPLE 8

A liquid crystal composition consisting of the following 6 components showed liquid crystal temperatures in the range of −20° C. or lower to +64° C. and a viscosity of 40 cp at 20° C.:

as $N_n$s in the form of compounds of formula (I),

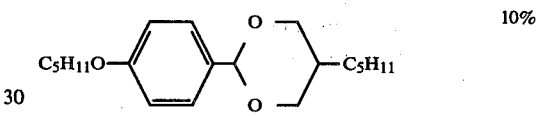 10%

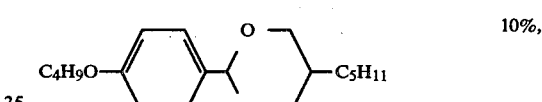 10%, as another $N_n$,

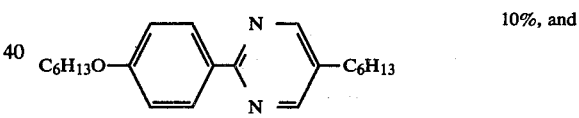 10%, and as $N_p$s,

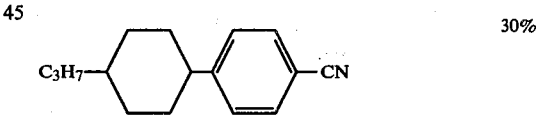 30%

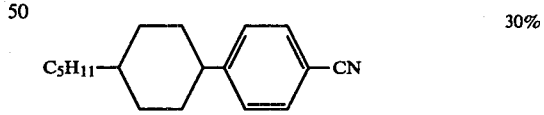 30%

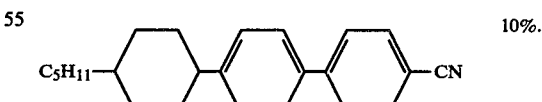 10%.

Further, at the time of a dynamic drive at ⅓ duty and ½ bias, the operating voltage was 3.3 V, the margin M was 24% and the temperature coefficient of the threshold voltages at 0° to 40° C. was 6 mV/°C.

EXAMPLE 9

A liquid crystal composition consisting of the following 6 components showed liquid crystal temperatures in the range of −20° C. or lower to +67° C. and a viscosity of 45 cp at 20° C.:

| as $N_n$s in the form of compounds of formula (I), | |
|---|---|
| 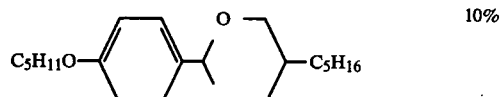 | 10% |
| 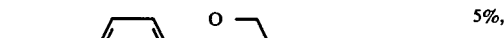 | 5%, |
| as another $N_n$, | |
|  | 10%, and |
| as $N_p$s, | |
| 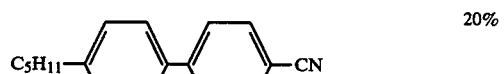 | 20% |
| 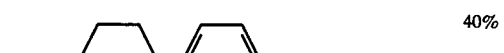 | 40% |
| 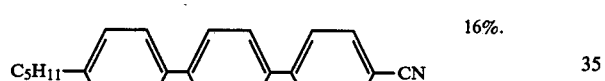 | 16%. |

Further, at the time of a dynamic drive at ⅓ duty and ⅓ bias, the operating voltage was 2.0 V, the margin was 20% and the temperature coefficient of the threshold voltages at 0° to 40° C. was 7 mV/°C.

EXAMPLE 10

A liquid crystal composition consisting of the following 5 components showed liquid crystal temperatures in the range of −20° C. or lower to +60° C. and a viscosity of 28 cp at 20° C.:

| as $N_n$s in the form of compounds of formula (I), | |
|---|---|
| 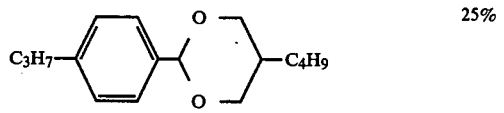 | 25% |
| 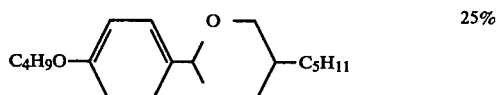 | 25% |
| 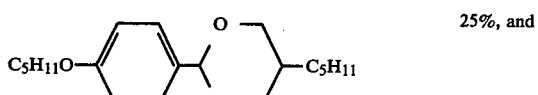 | 25%, and |
| as $N_p$s, | |

| | |
|---|---|
| 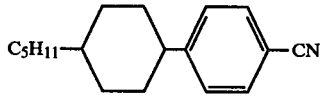 | 13% |
| 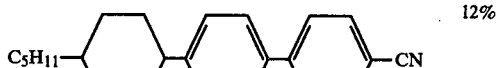 | 12% |

Further, at the time of a dynamic drive at ⅓ duty and ⅓ bias, the operating voltage was 4.5 V, the margin was 33% and the temperature coefficient of the threshold voltages at 0° to 40° C. was 6 mV/°C.

What is claimed is:

1. In a multiplexed drive liquid crystal display, the improvement wherein the liquid-crystalline composition comprises
   (a) 15 to 75% by weight of at least one compound having the formula

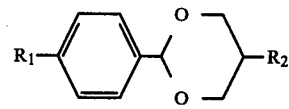

wherein $R_1$ represents an alkoxy group of 1 to 10 carbon atoms and $R_2$ represents an alkyl group of 1 to 10 carbon atoms, and
   (b) 25 to 76% by weight of at least one compound selected from the group consisting of

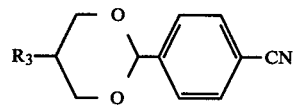

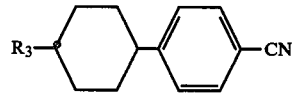

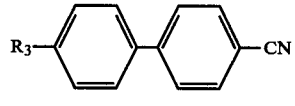

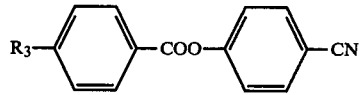

wherein $R_3$ represents an alkyl group having 1 to 7 carbon atoms.

2. The display containing the liquid-crystalline composition according to claim 1 wherein the composition contains up to 30% by weight of at least one compound selected from the group expressed by the formulas:

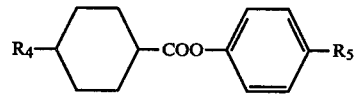

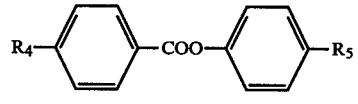

wherein $R_4$ and $R_5$ each represent an alkyl group or an alkoxy group of 1 to 7 carbon atoms.

* * * * *